Oct. 15, 1963
J. KOTRABA
3,107,001
ENDLESS MAGNETIC-TYPE CONVEYOR
Filed April 27, 1961
3 Sheets-Sheet 1
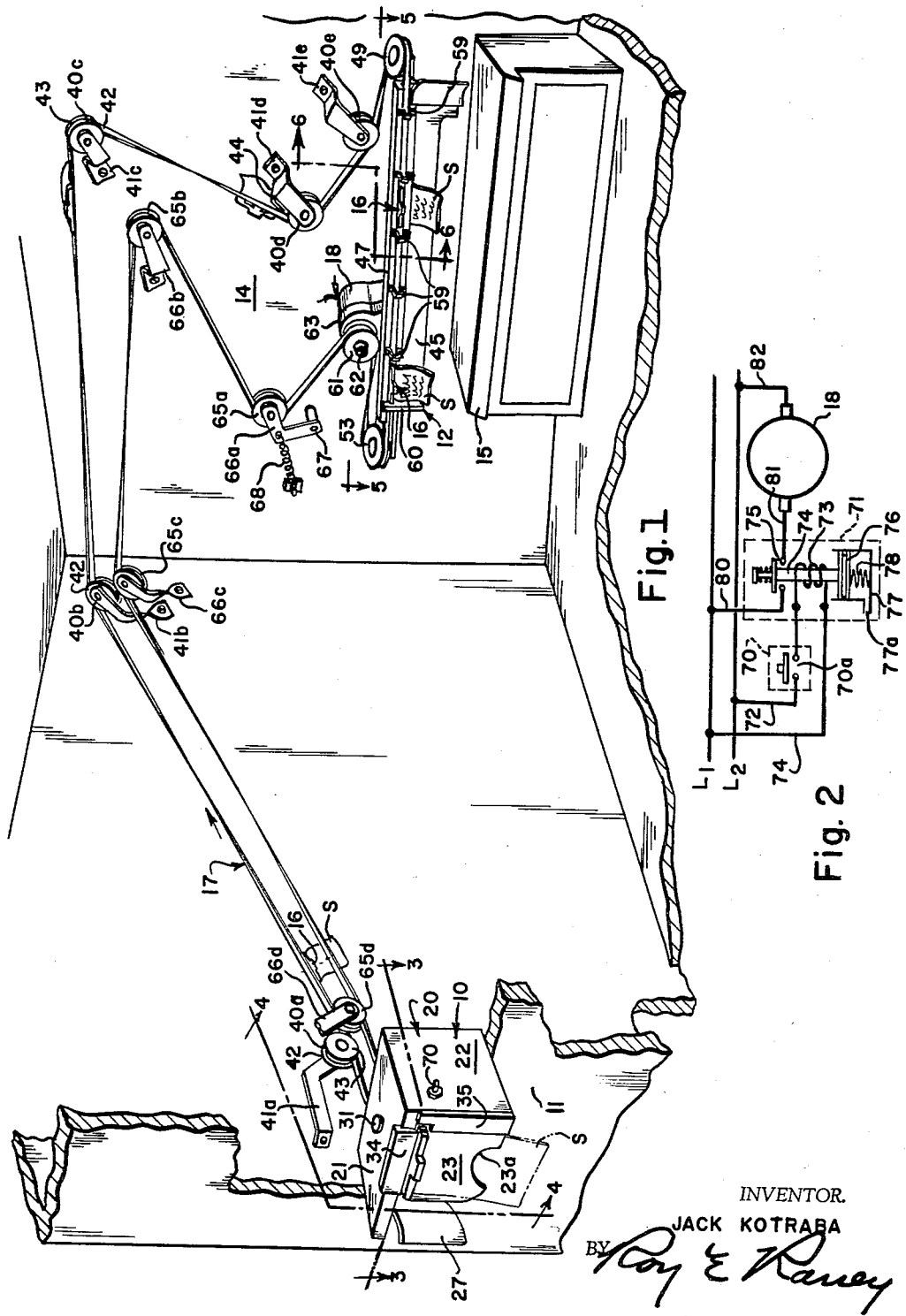
INVENTOR.
JACK KOTRABA
BY Roy E. Raney
ATTORNEY

INVENTOR.
JACK KOTRABA
ATTORNEY

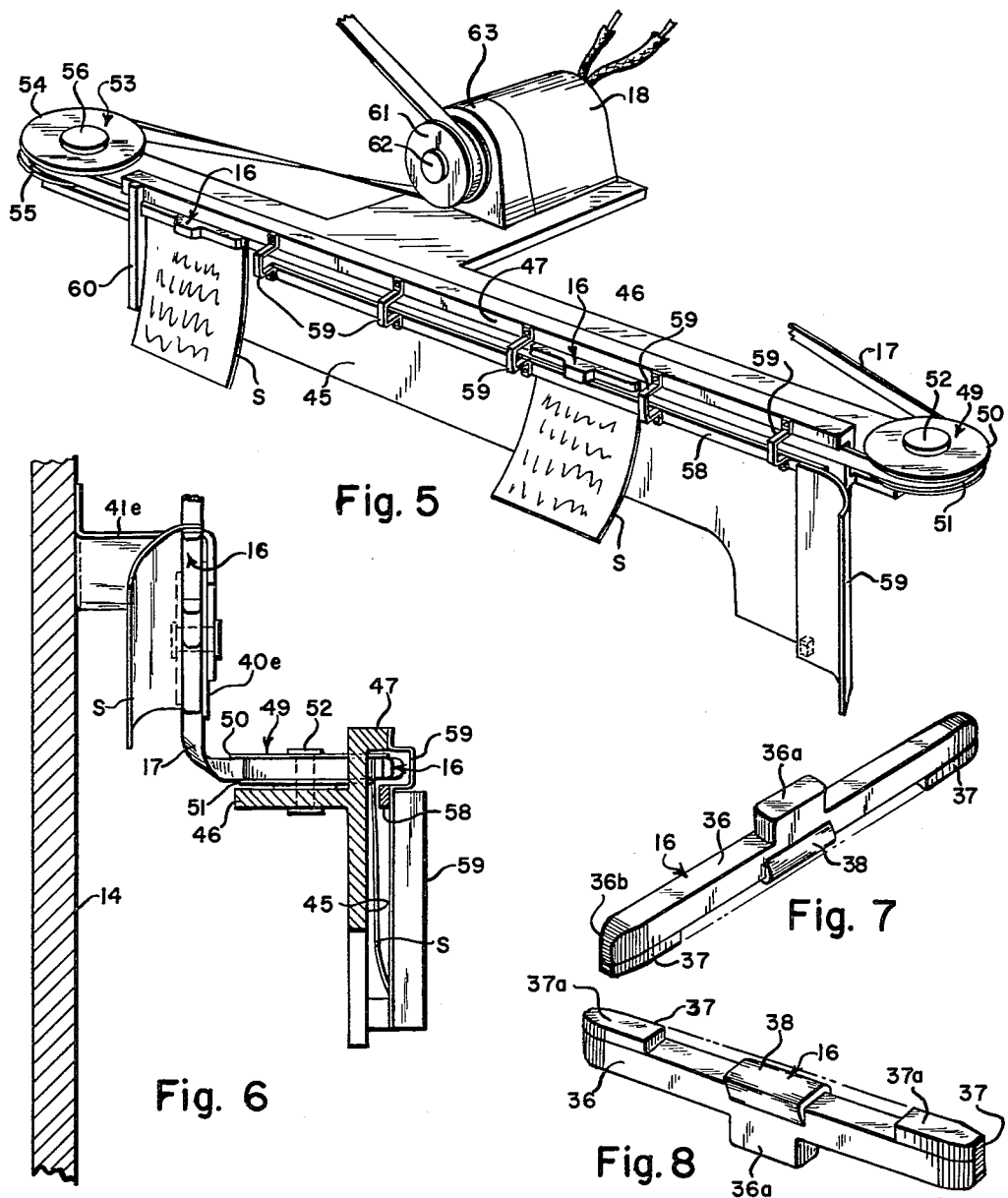

United States Patent Office 3,107,001
Patented Oct. 15, 1963

3,107,001
ENDLESS MAGNETIC-TYPE CONVEYOR
Jack Kotraba, 685 Dolphin Drive, Largo, Fla.
Filed Apr. 27, 1961, Ser. No. 106,047
3 Claims. (Cl. 198—41)

This invention relates to conveyor means for carrying small articles, papers, or the like from one location to another.

More particularly this invention is directed to a novel conveyor system for conveying information bearing cards or slips of paper from one station to another and, for example, is particularly useful in conveying order slips, made out by a waitress at a drive-in type restaurant, from a sending station remote from the kitchen to a receiving station located in the kitchen for the convenient use of the cook.

It is a principal object of the present invention to provide a conveyor system which can carry a plurality of slips, deposited at random intervals at a first station, to a second station where the slips will be arrested in alignment adjacent one another in the order deposited, and wherein the removal of a slip at the second station will cause all subsequent slips to move over to fill the gap left by the removal so that all remaining slips at the second station will be in their respective order of arrival. In one preferred form of the invention there is provided an endless flexible band having good magnetic susceptibility, such as a steel tape, which is supported for movement over a desired course by guide means such as pulleys, the course including one or more sending stations where order slips may be attached to the band by means of magnetic holders for movement with the band to a receiving station, and the receiving station comprising stop means for arresting the movement of the slips and magnetic holders while the band continues its movement with respect thereto.

As another object this invention aims to provide a particularly flexible and versatile conveyor system of the above mentioned character which is adapted to carry order slips over a tortuous path, the band being so disposed about the pulley means that the slips carried thereby are always on the outside of the turns, and wherein the pulleys between the sending and receiving stations are provided with a large flange on one side thereof for cooperation with the magnetic holders to automatically align skewed or twisted holders and slips with respect to the band.

Another object of this invention is the provision of a conveyor including novel magnetic holder means for clamping the slips to the moving band for movement between stations, the holder means being cooperable with the pulleys to align the slips with the band and comprising an elongated body member, of plastic or the like, having a slip engaging surface at each end and a permanent magnet recessed in the holder means between the ends thereof with the magnet spaced below a plane extending through the slip engaging surfaces so that a slip is held between those surfaces and the band when the latter is on a straight course, and are held between the magnet and the band when the latter is making a turn about a pulley, whereby the holder is free to be pivoted about the magnet into alignment with the band by the larger pulley flange.

Still another object of this invention is the provision of a slip conveyor employing a moving steel band and magnetic holders wherein the band is driven about its course of travel between the sending and receiving stations by an electric motor energized by an operator at the sending station upon depositing a slip, and wherein timing means are provided for controlling energization of the motor so that movement of the band is automatically halted shortly after the slip is arrested at the receiving station.

Other objects and advantages of the present invention will be apparent from the following description of a preferred embodiment thereof taken in conjunction with the accompanying sheets of drawings forming a part of this specification, and in which:

FIG. 1 is a schematic perspective view of a conveyor system embodying the present invention;

FIG. 2 is a schematic diagram of a motor control circuit for the conveyor system of FIG. 1;

FIG. 5 is an enlarged perspective view of the receiving station portion of the conveyor;

FIG. 6 is an enlarged fragmentary sectional view taken substantially along line 6—6 of FIG. 1;

FIG. 7 is a perspective view of a magnetic holder forming part of the conveyor system; and FIG. 8 is another perspective view of the magnetic holder.

Figure 3:
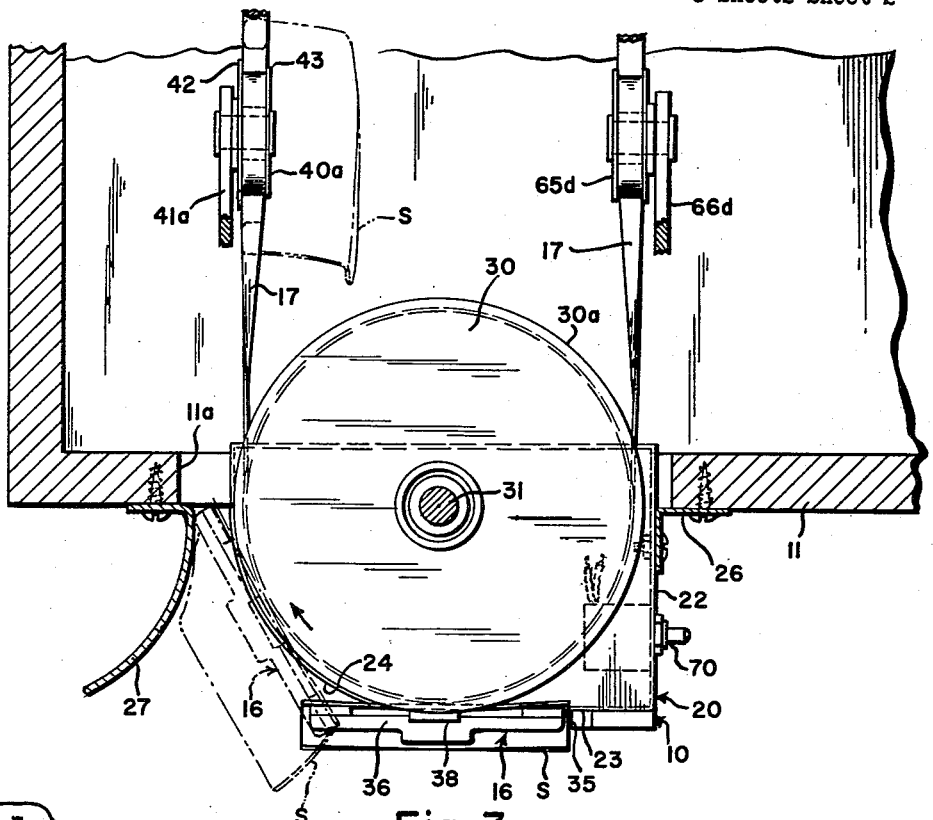
FIG. 3 is an enlarged sectional view of the sending station portion of the conveyor taken substantially along line 3—3 of FIG. 1.

Conveyor systems embodying the present invention may be utilized to advantage in those situations wherein it is desired to transmit information by cards or paper slips from one location to another, for example in factories, warehouses, mail order establishments, restaurants, and the like without requiring a messenger or waitress to actually carry the cards or slips personally. For purposes of illustration, the invention will be described with reference to use in conveying restaurant order slips made out by a waitress or other person, from a location remote from the kitchen to a location in the kitchen and arranged for the convenient reading and disposition by the cook.

In the form of the invention shown in the drawings and described hereinafter, there is provided an order slip sending station, generally indicated at 10, which is mounted in an opening 11a of a building wall 11 in a location convenient to the waitress, and a receiving station, generally indicated at 12, which is mounted on the inside wall 14 of the kitchen and over a stove or grill 15 in a location convenient to the cook. Order slips S, deposited by the waitress at the sending station 10, are fixed by magnetic holders 16 to an endless, flexible band 17 which is driven by a motor 18 to carry the slips from station 10 to receiving station 12 where they are arranged side by side in the order in which they were deposited, all in a manner which will become apparent as the description proceeds.

Figure 4:
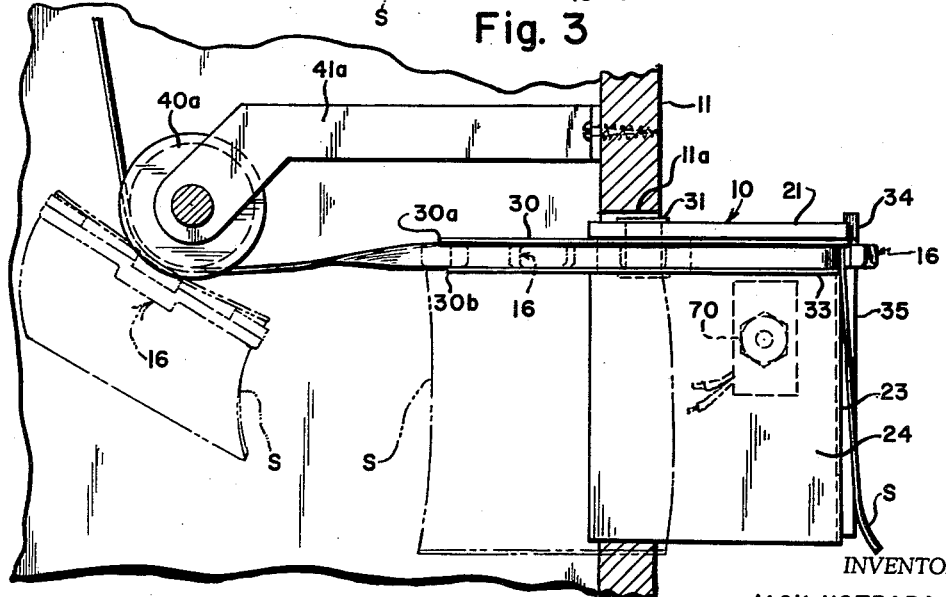
FIG. 4 is a sectional view on an enlarged scale taken substantially along line 4—4 of FIG. 1.

Sending station 10 comprises a generally box like housing 20, preferably formed of a molded plastic such as "Bakelite" or other rigid plastic material, and includes a top wall 21, an end wall 22, a front wall 23 having a finger clearance cut out 23a, and a curved wall 24 extending from the left hand portion of wall 23, as viewed in FIGS. 1 and 3, to form a curved guide surface leading into the wall opening 11a. Housing 20 is conveniently secured in opennig 11a by any suitable fastening means such as bracket 26. A curved guide member 27 is secured to wall 11 at the left-hand edge of opening 11a and serves to prevent "catching" of slips at the edge of the opening. A sheave or pulley 30, formed of plastic or other non-magnetic material and having a large upper flange 30a and a small lower flange 30b, is rotatably mounted within housing 20 adjacent the lower side of top wall 21 by an axle shaft 31. A sector of the marginal edge of pulley 30 is exposed through an opening 33 defined between top wall 21 and the upper edges of walls 23 and 24 with the curvature of wall 24 following the curvature of pulley flange 30b as is best illustrated in FIGS. 3 and 4.

Flexible band 17, which is preferably formed of steel or other material having good magnetic susceptibility, is lead into the open back side of housing 20 and around pulley 30 so that one surface of the band is exposed through opening 33. A horizontally extending straight edge or guide rib 34 is formed on the front edge of top wall 21 in overlying relation to pulley flange 30a, and a vertically extending straight edge or guide rib 35 is formed along the right hand edge of front wall 23. Guide ribs 34 and 35 provide means against which the top and side edges of an order slip S may be abutted for alignment of the upper marginal edge thereof in overlying relation to the outer surface of band 17 exposed in opening 33. When a slip S is so positioned it may be secured or clamped to the movable band 17 by a magnetic holder generally indicated at 16, so that the slip S will be constrained to move with the band as it travels around pulley 30.

Referring to FIGS. 7 and 8, there is illustrated therein one of the magnetic holders 16. Holder 16 comprises an elongated body member 36, having a centrally located handle 36a and tapered ends as shown at 36b. A rubber pad 37 is secured to each end of body member 36 on the side opposite handle 36a as by cementing. Pads 37 present slip engaging friction surfaces 37a which are spaced from one another so as to engage opposite edge portions of a slip S. Located between pads 37, and recessed into body member 36, is a small permanent magnet 38. Magnet 38 is recessed sufficiently into body member 36 so that its exposed surface lies below a plane extending through pad surfaces 37a for a purpose which will presently be made apparent. Magnet holders 16 are magnetically attracted to the flexible band 17 and cooperate therewith to firmly grip slips S so as to be carried by movement of the band from sending station 10 to receiving station 12.

Endless band 17 is guided in its course leading from sending station 10 to receiving station 12 by plastic guide pulleys 40a, 40b, 40c, 40d and 40e mounted by suitable bracket means 41a, 41b, 41c, 41d and 41e, respectively, as shown. Each of the pulleys 40a–40e comprise a large flange 42 and a smaller flange 43, the flanges cooperating to keep the flexible band on the pulley and the large flange being adapted to align the magnetic holders 16 and slips S with the band as they negotiate a turn around the pulley. The alignment is accomplished by having the large flanges 42 slightly overhang the flexible band 17 so that a magnetic holder 16 which is askew on the band will be engaged by the large flange as the holder passes about the pulley and be cammed into alignment with the band. Because the surface of magnet 38 is slightly below the surfaces 37a of pads 37, the slips will normally be gripped between the pads and the band. However, when negotiating a turn about a pulley the slips are held between the magnet and the band, the magnet then providing a pivot point for the alignment of the holder and slip by the larger flange 42 in the just described manner.

The sizes of the pulleys, band, and holders would necessarily be determined by the size of slips or cards being conveyed. In the present example, however, for order slips of a more or less standard size, approximately 3½ inches by 5 inches, it has been found that a steel band 17 about ½ inch wide and 1/64 inches in thickness, a sending station pulley 30 on the order of 6 inches in diameter, and guide pulleys on the order of 3 inches in diameter, provide a particularly serviceable and trouble free arrangement. It has also been found that in guide pulleys of the size mentioned, and with the band size mentioned, the larger flanges 42 should overhand the band by approximately ⅜ inch to provide the proper magnetic holder aligning action. It will be recognized that the surface of band 17 to which the slips S are attached must always remain to the outside in passing about the guide pulleys, and accordingly band 17 is twisted an appropriate amount, as shown, between each of the pulleys to maintain that relationship. Also, slip deflecting guides, such as guide 44 associated with bracket 41d, may be provided wherever necessary to prevent interference with movement of the slips S around brackets or other fixtures.

Receiving station 12 comprises an elongated panel 45 lying in a vertical plane and a horizontal shelf 46 extending rearwardly from the back surface of panel 45. Panel 45 is provided along its upper edge with an outstanding guide rib 47, and the shelf, rib and panel may be conveniently formed as an integral unit. A pulley 49 having a large holder aligning flange 50 and a small flange 51, is rotatably mounted by axle means 52 on the right hand end of shelf 46 as viewed in the drawings. A pulley 53 which may have upper and lower flanges 54 and 55 of equal diameter is rotatably mounted by suitable axle means 56 at the opposite end of shelf 46. Pulleys 49 and 53 are disposed to lead the flexible band 17 across the front surface of panel 45 immediately below the outwardly projecting guide rib 47.

A guide bar 58 is supported in spaced parallel relation to rib 47 by suitable U-shaped brackets 59, as shown, with guide bar 58 being spaced also from the front surface of panel 45. U-shaped brackets 59 are of sufficient size to provide clearance for the passage of holders 16 as they are carried by band 17 between parallel guides 46 and 58 with the order slips S depending between guide bar 58 and panel 45.

An outwardly curving guide member 59 is mounted at the entry end of guide bar 58 and in spaced relation to panel 45 to guide the slips S beneath the bar 58 and to smooth the slips to reduce outward curling thereof. At the left-hand end of panel 45 a vertical stop rib 60 is provided to arrest the movement of holders 16 and slips S with the band 17. Band 17 has a polished surface which permits it to continue its movement although the holders and slips are arrested by rib 60, and are maintained in position against the band by the magnetic attraction of the holders for the band.

After one holder 16 and its associated slip is arrested, that holder then becomes a stop element for the next holder and slip, which in turn stops the next following holder. The slips S are therefore automatically arranged in a side-by-side manner in the order in which they are deposited at the sending station, and orders may be started by the cook in their proper turn. Moreover, if an intermediate order is completed before the ones submitted earlier, the cook simply pulls the slip S down from between holder 16 and band 17 and at the same time, or thereafter, removes the holder from between guides 47, 58. Upon so doing, all of the holders 16 and slips S to the right of the ones removed will be shifted to the left by hand 17 until the gap left by the removal is filled. The remaining order slips will therefore always be maintained in their proper relation and orders will be filled in the most expeditious manner possible.

From pulley 53 band 17 extends about a drive pulley 61 carried by an output shaft 62 of gear reduction means 63 driven by the previously mentioned electric motor 18 which is conveniently mounted on shelf 46. Band 17 extends from drive pulley 61 in its return course to sending station 10 around a series of guide pulleys 65a, 65b, 65c and 65d to pulley 30 of the sending station. Each of pulleys 65a–65d are supported by suitable bracket means 66a–66d. Bracket 66a is preferably pivoted as at 67 and is biased by a spring 68 to apply suitable tension to flexible band 17 and to compensate for variations in the length thereof due to expansion and contraction with changes of temperature.

Motor 18 and gear reduction means 58 are so selected as to provide a linear speed or rate of travel of band 17 in the order of three feet per second in the present example, and, although the motor may be operated to drive the band continuously, means are provided to energize motor 18 upon depositing a slip at the sending station 10, and for de-energizing the motor automatically after the slip has been arrested at the receiving station 12. Referring particularly to FIGS. 1 and 2, a starting switch 70 is mounted on wall 22 of sending station housing 20 where it may be conveniently operated by a waitress after she has deposited a slip S against wall 23 and secured it to band 17 by means of a holder 16. Switch 70, which is preferably a normally open push button type switch, is adapted to control the energization of a time delay relay means 71 which in turn controls energization of motor 18. Motor 18 and relay 71 are energized from a suitable power source such as 110 v. A.C. provided by power lines L1 and L2.

Upon closing of push button switch 70, a circuit may be traced from line L2 through conductor 72, now closed contacts 70a of switch 70, solenoid 73 of time-delay relay 71, and conductor 74 to line L1. Energization of solenoid 73 draws in relay armature 74, closing contacts 75 and shifting piston 76 in pneumatic dash-pot 77 against a biasing spring 78 therein. A circuit may now be traced from line L1 through conductor 80, now closed contacts 75, conductor 81, motor 18, and conductor 82 to power line L2, thereby energizing motor 18 and causing band 17 to be driven in a sense to carry a deposited slip S from sending station 10 to receiving station 12.

Dash pot 77 has a restricted air inlet orifice 77a which retards movement of piston 76 under the influence of spring 78 when push button 70 is released, so that there is a delay imposed in the opening of contacts 75 and in de-energization of motor 18. Orifice 77a may be adjusted in any suitable manner so that the delay in opening of contacts 75 allows motor 18 to run for a time period sufficient for band 17 to carry a slip from sending station 10 to the stop rib 60 of receiving station 12. If a second slip S is deposited and switch 70 is operated before the first deposited slip reaches its destination, motor 18 will run for a full time period determined only by the last operation of switch 70 and relay 71. Accordingly, the conveyor system will always clear itself of slips S in transit before coming to a halt.

While in the preferred example described, the holders 16 include permanent magnets and band 17 has no permanent magnetic qualities of its own, it will be understood that band 17 could be replaced by a band having permanent magnetic attraction for non-magnetized holders. Moreover, it will be evident that the slips S, or other conveyed items, could be attached directly to the holders, rather than held between the holders and the band.

From the foregoing detailed description of a conveyor system embodying the present invention it will be appreciated that there has been provided thereby a particularly simple, yet versatile, apparatus which efficiently carries slips or cards from one location to another and places them in sequential order at their destination, and maintains the slips arranged in a side-by-side sequential order even though intermediate slips are removed. It will also be appreciated that the provision of a large and a small flange on the guide pulleys cooperate with the magnetic holder means 16 to automatically align skewed holders and slips in a particularly effective manner.

Although the present invention has been described in considerable detail with reference to a specific conveyor system and a specific use, it will be understood that the invention is not limited to the embodiments and uses described, but rather the invention includes all those modifications, adaptations and uses as are reasonably embraced by the scope of the claims hereof.

Having thus described my invention, I claim:

1. A conveyor system of the character described comprising a sending station and a receiving station for paper slips, an endless flexible band of magnetically susceptible material supported by a plurality of pulleys for movement about a course including said sending and receiving stations, drive means engaging said flexible band for effecting said movement, elongated magnetic holder means in cooperative relation with said band for slideably gripping slips of paper to said band for movement therewith from said sending station to said receiving station, and said receiving station including stop means for arresting movement of said holder means and said slips while permitting continued movement of said band with respect thereto, said holder means having a long dimension exceeding the width of said band, and at least one of said pulleys having a flange overlying said band whereby skewed holder means are engaged by said flange and aligned with said band prior to arrival at said receiving station.

2. Conveyor apparatus of the character described comprising a flexible band of magnetically attracted material, pulley means supporting said band for movement over a described course, an elongated magnetic holder means for holding articles on said band, said pulley means having a flange overhanging said band, said holder means comprising an elongated body member having article engaging surfaces at opposite ends thereof and a permanent magnet disposed between said ends, said flange being adapted to engage and align said magnetic holder means with said band upon passing of said band and holder means around said pulley means.

3. Conveyor apparatus of the character described comprising an endless flexible band of magnetically attracted material, pulley means supporting said band for movement over a described course, an elongated magnetic holder means for holding articles on said band, said holder means being magnetically held to said band and having a long dimension greater than the width of said band, said holder being movable to change the angular relationship of said long dimension to said band, said pulley means having a narrow flange in guiding relation to one side of said band and a wide flange overhanging the other side of said band so as to engage and align said magnetic holder means with said band upon passing of said band and holder means around said pulley means.

References Cited in the file of this patent
UNITED STATES PATENTS

| | | |
|---|---|---|
| 1,856,733 | Shepherd | May 3, 1932 |
| 2,996,040 | Bofinger | Aug. 15, 1961 |